Patented Mar. 20, 1923.

1,449,110

UNITED STATES PATENT OFFICE.

FRIEDRICH HAYDUCK, OF WILMERSDORF, GERMANY, ASSIGNOR TO THE FLEISCHMANN COMPANY, OF NEW YORK, N. Y., A CORPORATION OF OHIO.

LOW-ALCOHOL YEAST PROCESS.

No Drawing. Application filed October 30, 1920. Serial No. 420,837.

(GRANTED UNDER THE PROVISIONS OF THE ACT OF MARCH 3, 1921, 41 STAT. L., 1313.)

*To all whom it may concern:*

Be it known that I, FRIEDRICH HAYDUCK, citizen of Germany, residing at Wilmersdorf, Germany, have invented certain new and useful Improvements in Low-Alcohol Yeast Processes (for which application for patent was filed in Germany, April 15, 1915, Patent No. 304,242), of which the following is a specification.

This invention relates to a process for the manufacture of yeast, and particularly to a process for manufacturing a compressed bakers' yeast in which very little alcohol is produced as a by-product, and has for its object an improved procedure for manufacturing yeast in a more convenient and economical manner than heretofore.

In the process described in my German patent 303,222 and in my corresponding application for United States Patent, Serial No. 420,833, filed October 30, 1920, the gradual addition of the wort is used principally for the purpose of enabling the yeast to prevent the accumulation of such salts, which as I have discovered are injurious to it in higher concentration, by immediately consuming same. This is accomplished as described in the above mentioned application by preparing a nutrient wort having a relatively high specific gravity comprising essentially sugar material and yeast nourishing inorganic salts, diluting a portion thereof and seeding this portion with yeast, aerating the seeded portion while slowly and continuously adding the wort of higher concentration at such a rate that the concentration of the diluted portion is maintained at such a degree of dilution that substantially all of the alcohol which may be formed is assimilated by the yeast, the deleterious acidity produced by the partial assimilation of the nutrient salts by the yeast being neutralized by the addition of a suitable substance having an alkaline reaction.

I have now discovered that a similar advantage applies in a still greater and surprising degree with regard to other substances which within certain limits can be designated as yeast poisons such as free alkalies and salts having an alkaline reaction, for instance ammonium or potassium hydrate and their carbonates.

The process based on my present discovery permits of the utilization of these substances for the nutrition of yeast for the reason that they, together with the wort, are added so slowly to the yeast that their concentration, when in contact with the yeast, always remains below the danger limit. The use of the said alkalies and their carbonates also offers the advantage that yeast propagated in the solution containing the same cannot set free any deleterious excess of mineral acid which would remain unneutralized in the wort and that therefore a further special neutralization of the worts during the fermentation becomes unnecessary.

The process can for example be carried out in the following manner.

A nutrient solution is produced by using 100 kilos molasses, 2 kilos nitrogen in the form of ammonia water, 2 kilos phosphoric acid in the form of superphosphate, 0.5 kilo ammonium sulphate, 500 liters of water. This nutrient solution, which has a strongly alkaline reaction, is allowed to flow slowly and substantially continuously into the pitch or seed yeast, which has been previously distributed in about 4500 liters of water and which is being constantly aerated. It will be seen, however, that if desired the seed yeast could be suspended in a very dilute solution of the nutrient wort, as is shown, for example, in my co-pending application Serial No. 420,833, above referred to, it being apparent, however, that the liquid in which the yeast is initially suspended must be non-toxic to the yeast. The yeast, which immediately starts taking up nourishment as soon as the inflow of the solution starts, absorbs completely or practically completely any quantities of ammonia which may be found in the liquid, so that at any time there is only a very small excess of alkali (ammonia) in contact with the yeast. The addition of the nutrient solution may be completed in about eight hours. After a short subsequent aeration, in order to facilitate the absorption of the last remaining nutrient substances by the yeast, the yeast propagation process is completed.

Having described my invention, what I claim as new and desire to secure by Letters Patent is:—

1. A process of propagating yeast with a relatively low yield of alcohol which comprises, suspending seed yeast in a non-toxic aqueous liquid, aerating the liquid, and substantially continuously adding thereto during the period of propagation a yeast nutrient solution containing a free alkali, whereby a weakly alkaline environment is maintained for the yeast.

2. A process of propagating yeast with a relatively low yield of alcohol which comprises suspending seed yeast in a non-toxic aqueous liquid, aerating the liquid, and adding thereto during the period of propagation a yeast nutrient solution containing a compound having an alkaline reaction and adapted to be assimilated by the yeast, such solution being added substantially continuously and at such a rate that the compound having an alkaline reaction is practically completely assimilated by the yeast, whereby a weakly alkaline environment is maintained for the yeast.

3. A process of propagating yeast with a relatively low yield of alcohol which comprises suspending seed yeast in a non-toxic aqueous liquid, aerating the liquid, and adding thereto during the period of propagation a yeast nutrient solution including a compound containing yeast assimilable nitrogen and having an alkaline reaction and being adapted to be assimilated by the yeast, such solution being added substantially continuously and at a rate such that the compound having an alkaline reaction is practically completely assimilated by the yeast, whereby a weakly alkaline environment is maintained for the yeast.

4. A process of propagating yeast with a relatively low yield of alcohol, which comprises suspending a non-toxic seed yeast in aqueous liquid, aerating the liquid, and adding thereto during the period of propagation a yeast nutrient solution containing a free alkali adapted to be assimilated by the yeast, such solution being added substantially continuously and at a rate such that the alkali is practically completely assimilated by the yeast, whereby a weakly alkaline environment is maintained for the yeast.

5. A process of propagating yeast with a relatively low yield of alcohol which comprises suspending seed yeast in a non-toxic aqueous liquid, aerating the liquid, and adding thereto during the period of propagation a yeast nutrient solution containing ammonium hydrate, such solution being added substantially continuously and at a rate such that the ammonium hydrate is practically completely assimilated by the yeast, whereby a weakly alkaline environment is maintained for the yeast.

6. A process of propagating yeast with a relatively low yield of alcohol which comprises preparing a nutrient solution containing essentially sugar material, yeast nourishing inorganic salts and ammonium hydrate, suspending seed yeast in a relatively large volume of water, aerating the suspension, and slowly and substantially continuously adding the yeast nutrient solution at a rate such that the ammonium hydrate is practically completely assimilated by the yeast, whereby a weakly alkaline environment is maintained for the yeast.

7. A process of propagating yeast with a relatively low yield of alcohol which comprises preparing a yeast nutrient solution comprising essentially sugar material, yeast nourishing inorganic salts and ammonium hydrate, suspending seed yeast in water, aerating the suspension, and substantially continuously adding the nutrient solution thereto, the rate of addition being so proportioned relative to the amount of water in the suspension that the ammonium hydrate and any alcohol which may be formed is practically completely assimilated by the yeast and a weakly alkaline environment is maintained for the yeast.

In testimony whereof, I have affixed my signature.

FRIEDRICH HAYDUCK.

Certificate of Correction.

It is hereby certified that in Letters Patent No. 1,449,110, granted March 20, 1923, upon the application of Friedrich Hayduck, of Wilmersdorf, Germany, for an improvement in "Low-Alcohol Yeast Processes," an error appears in the printed specification requiring correction as follows: Page 2, lines 40 and 41, claim 4, strike out the words " a non-toxic seed yeast in " and insert instead *seed yeast in a non-toxic;* and that the said Letters Patent should be read with this correction therein that the same may conform to the record of the case in the Patent Office.

Signed and sealed this 29th day of May, A. D., 1923.

[SEAL.]

KARL FENNING,
*Acting Commissioner of Patents.*